United States Patent [19]

Kojima

[11] Patent Number: 4,933,875

[45] Date of Patent: Jun. 12, 1990

[54] BI-DIRECTIONAL PRINTER FOR EFFICIENT OF STORED DATA AND REAL-TIME INPUT DATA

[75] Inventor: Yasumichi Kojima, Nagoya, Japan

[73] Assignee: Brother Kogyo Kabushika Kaisha, Japan

[21] Appl. No.: 178,975

[22] Filed: Apr. 7, 1988

[30] Foreign Application Priority Data

Apr. 16, 1987 [JP] Japan .................................. 62-93543

[51] Int. Cl.5 .............................................. H04N 1/00

[52] U.S. Cl. ...................................... 364/519; 400/63; 400/706

[58] Field of Search ... 364/521, 518, 519, 900 MS File; 400/63, 706, 83

[56] References Cited

U.S. PATENT DOCUMENTS

| | | | |
|---|---|---|---|
| 3,764,994 | 10/1973 | Brooks et al. | 340/172.5 |
| 3,895,704 | 7/1975 | Norris | 197/19 |
| 4,353,298 | 10/1982 | Baker et al. | 364/900 X |
| 4,591,969 | 5/1986 | Bloom et al. | 364/183 |
| 4,646,259 | 2/1987 | Lincoln et al. | 364/900 |
| 4,649,501 | 3/1987 | Bloom et al. | 364/519 |
| 4,734,868 | 3/1988 | DeLacy | 364/519 |
| 4,746,941 | 5/1988 | Pham et al. | 364/519 |
| 4,823,286 | 4/1989 | Lumelsky et al. | 364/521 |

*Primary Examiner*—Gary V. Harkcom
*Assistant Examiner*—Phu K. Nguyen
*Attorney, Agent, or Firm*—Oliff & Berridge

[57] ABSTRACT

A printer having a bi-directional shortcut printing function, in which a printing pause line or a last line of previously stored text is identified and character data of the printing pause line or last print line is always printed in the normal direction. Since a carriage stops at the position where the last character of the printing pause line or last line is printed, it is effective to subsequently continue printing characters input by manual typing from that position in real time.

8 Claims, 4 Drawing Sheets

BI-DIRECTIONAL PRINTER FOR EFFICIENT OF STORED DATA AND REAL-TIME INPUT DATA

BACKGROUND OF THE INVENTION

1. Field of the Invention

This invention relates to a printer which cooperates with an electronic typewriter or a word processor, especially to a printer having a bi-directional printing function.

2. Prior Art

Various types of printers for printing character data stored in a memory means have been proposed. Many of them have a bi-directional shortcut printing function to minimize print head (carriage) movement and realize high-speed printing (for example, in U.S. Pat. No. 3,764,994). In order to minimize the distance for moving the carriage when it reaches the end of the printed line and is to be shifted to the next print line, the carriage is controlled to move from the current position, i.e., the end of the current print line, to the nearest end of the next print line. Namely, the carriage can move either in the normal direction (from left to right) along the order of the print data or in the reverse direction (from right to left), responsive to the end position of the next print line. As a result, the time required for moving the carriage to the next print line can be greatly reduced The printer, however, is not necessarily used for exclusively printing the character data stored in the memory means. It is sometimes required to print the character data input by manual typing operation in real time. In a conventional printer with the bi-directional shortcut printing function, the last line is not necessarily printed in the normal direction. When the last line is printed in the reverse direction, the carriage finally stops at the left end of the last print line. Under such condition, if it is desired that following character data is input by manual typing operation, the carriage must be moved from the left end of the last print line to the currently required print position to subsequently print the character data input by manual typing. If the operator carelessly performs subsequent typing without moving the carriage to the last printed position, another character is printed over already printed character, which requires time and tedious correcting operations. Since this movement of the carriage is inharmonious with the input performance, it seems strange to the operator. Moreover, it is inconvenient that the carriage is moved from the left end position to the currently required print position every time manual input is executed and, as the movement of the carriage requires some time, prompt manual typing is prevented.

SUMMARY OF THE INVENTION

An object of the present invention is to provide a bi-directional printer in which character data stored in a memory means can be printed at high speed by an efficient movement of a carriage.

Another object of the present invention is to provide a bi-directional printer which can quickly react to a switch in the print mode, i.e., from a mode for printing stored data to a mode for printing real-time data input by manual typing, and not seem unnatural to the operator.

To achieve these and other objects, the printer of the present invention has a constitution set forth. Namely, as shown in FIG. 1, the printer of the present invention includes memory means M1 for storing a text to be printed; bi-directional printing means M2 for printing the text on a line by line basis in a normal direction or in a reverse direction for realizing a minimum carriage travel between lines; line identifying means M3 for identifying a printing pause line or a last line of the text; and control means M4 for disabling the bi-directional printing means and for printing the printing pause line or the last line in the normal direction when the line identifying means identifies the printing pause line or the last line of the text.

The printing pause line or the last line to be identified by the line identifying means M3 includes such printing lines in which printing is terminated by manual control or printing is temporarily terminated to allow intervention of data input by manual typing among stored print data, as well as a printing line including a stop code for terminating printing and a final printing line designated by an end-of-the-file code. Namely, the printing pause line or the last line in the present invention is identified by any printing lines in which printing may be finished, interrupted or terminated by manual typing for inputting print data.

BRIEF EXPLANATION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

Figure 1:
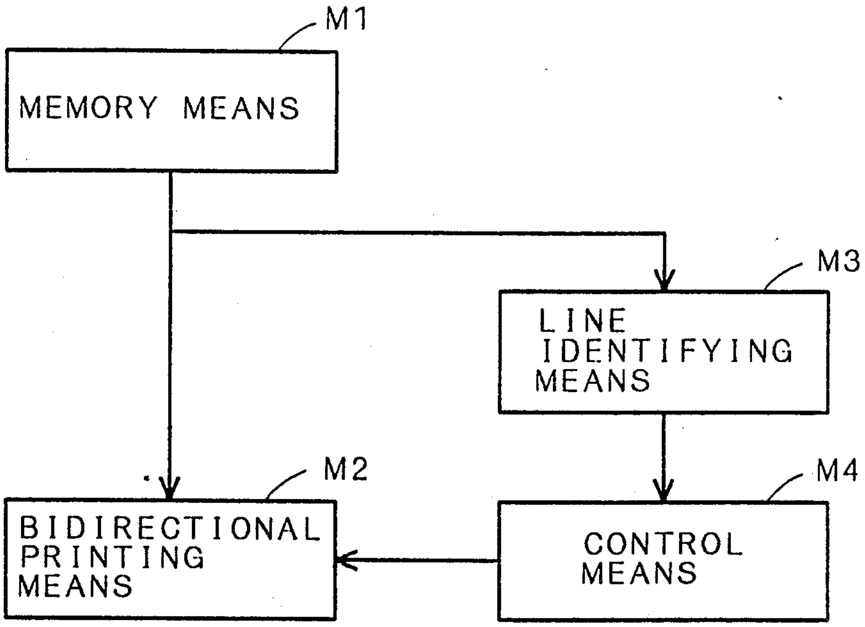
FIG. 1 is a schematic view showing a fundamental structure of the present invention.
Figure 2:
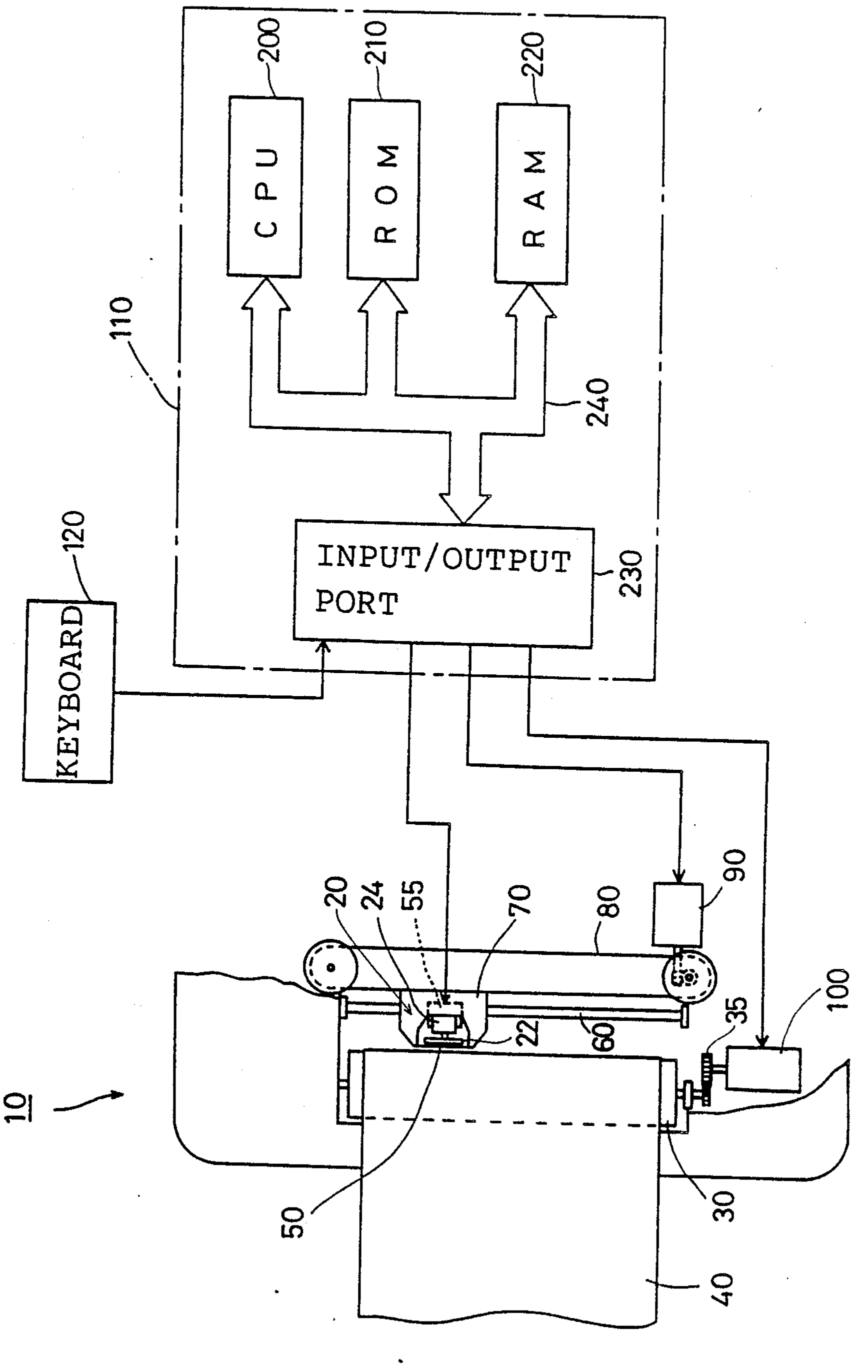
FIG. 2 is a system diagram of a printer in an embodiment of the present invention.

As shown in FIG. 2, a printing mechanism 10 of a printer of the present invention includes a print head 20 consisting of a typewheel 22 and a print hammer 24 so as to print characters on a printing paper 40 which is set on a platen 30. The print head 20 and a print ribbon 50 are provided on a carriage 70 which is slidably supported by a guide shaft 60. Characters to be printed are selected by a first stepping motor (WH motor) 55. The carriage 70 is driven by a second stepping motor (CA motor) 90 via a belt 80 so as to move the print head 20 to a designated position along the longitudinal direction of the platen 30. The platen 30 is driven by a third stepping motor (LF motor) 100 which is connected to the platen via a gear mechanism 35 to feed the printing paper 40 by a predetermined interval. An electronic control unit (ECU) 110 includes known CPU 200, ROM 210, RAM 220, an input/output (I/O) port 230 and a common bus 240 for connecting each of them. At the I/O port 230, signal conversion processing is executed between signals output to each stepping motor 55, 90 and 100 of the printing mechanism 10 or signals input from a keyboard 120 and digital signals to be processed by the CPU 200.

In the printer featuring the above-mentioned constitution, the character data input from the keyboard 120 are stored and read out by the ECU 110 so as to control the performance of the stepping motors 55, 90 and 100 of the printing mechanism 10 and the print head 220.

First, the print data input from the keyboard 120 is stored by the ECU 110. When it is determined to print the stored data, the ECU 110 drives the WH motor 55 to select characters (type faces of the typewheel 22) corresponding to the respective character data, and subsequently drives the CA motor 90 and the LF motor 100 to print the characters. On the other hand, when a code corresponding to manual typing mode is input from the keyboard 120, the above-mentioned stepping motors are driven to print the character data input from the keyboard 120 in real time.

In order to print the stored character data at a high speed and also to quickly and naturally respond to the real-time print mode engaged by manual typing at any time, a print program set forth is carried out when the print is executed by controlling the above-mentioned stepping motors.

Figure 3:
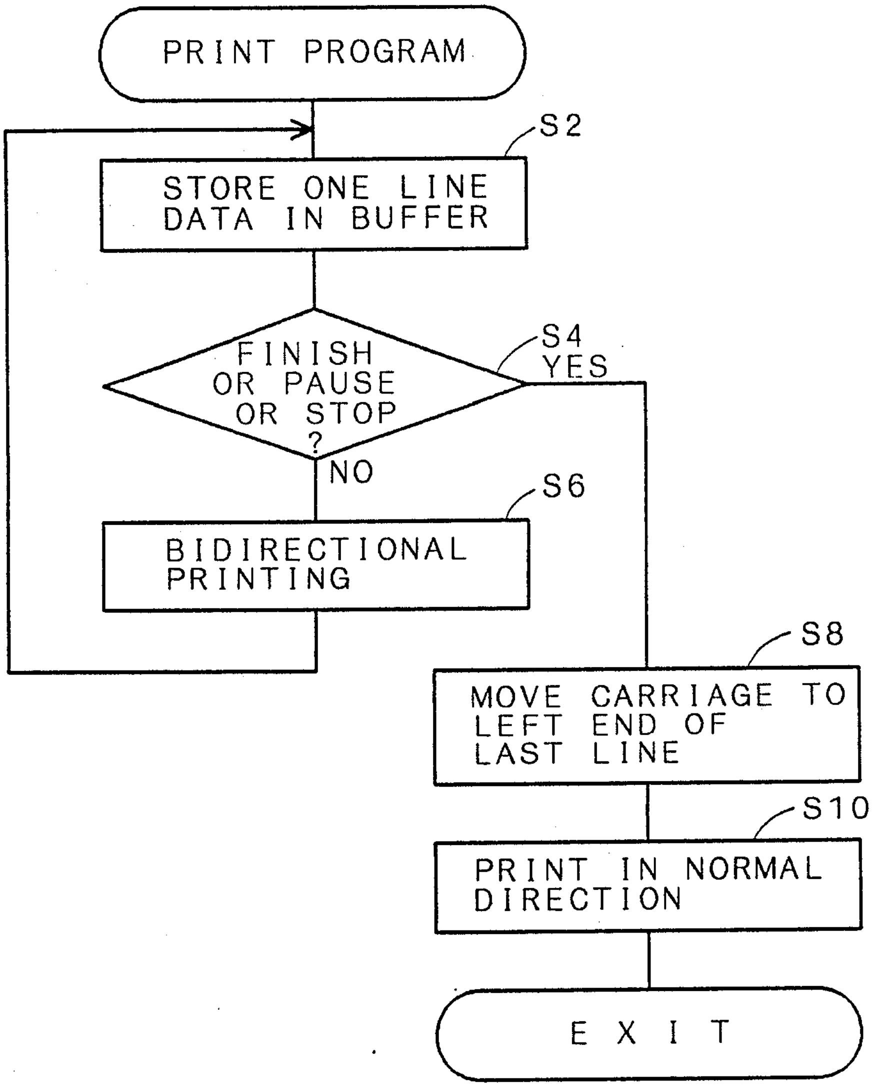
FIG. 3 is a flowchart of a print program to be executed in the embodiment of the present invention.

The print program is shown in the flowchart of FIG. 3. The program is previously stored in the ROM 210 of the ECU 110. To execute printing, the program is read out from the ROM 210 and is processed by the CPU 200. The print program executed by the CPU 200 is set forth in detail with reference to the flowchart of FIG. 3.

At S2 (steps are referred to as "S"), one line data to be printed is read out from RAM 220 and stored in a predetermined print buffer by the CPU 200. At subsequent S4, the data in the print buffer is read out one by one to determine whether any control code data for finishing, pausing or stopping the print exists in the print buffer. If it is determined that the one line data stored in the print buffer does not include any of the above-mentioned control codes, i.e. the line is not the printing pause line or the last line to be printed, a known bi-directional shortcut printing function for minimizing the movement of the carriage 70 is executed at S6. After the one line data stored in the print buffer is printed, the program returns to S2. Then, the next one line data to be printed is read out from RAM 220 and stored in the print buffer. Thereafter, the same routine from S2 to S6 is repeated.

On the other hand, if it is determined at S4 that the data stored in the print buffer includes the control code for indicating the printing pause line or the last line to be printed, the program proceeds to S8. At S8, the carriage 70 is immediately moved to the left end position of the next print line to start printing in the normal direction. Subsequently, the program proceeds to S10, at which the character data of the line stored in the print buffer is printed in the normal direction. Then, the present control program is completed.

Figure 4:
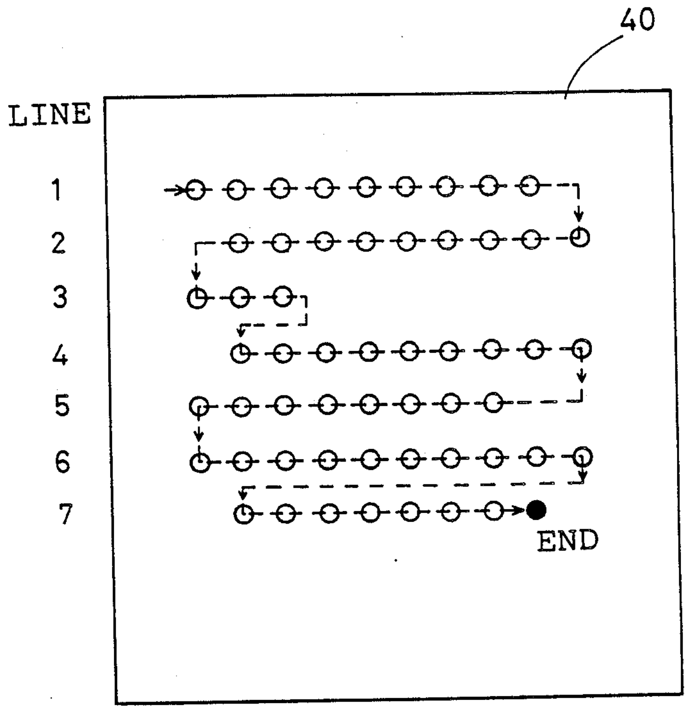
FIG. 4 shows an example of the order of printing by the printer of the present invention.

By utilizing the printer of the present invention, the character data are printed on the printing paper 40 in accordance with the order shown in FIG. 4. In the print lines excepting the printing pause line or the last line, i.e. from the first line to the sixth line in the figure, the carriage 70 moves bi-directionally taking the shortest course to print the character data by using the known bi-directional shortcut printing function. Only in the case that the carriage 70 is shifted to the last print line (the seventh line in FIG. 4), the bi-directional shortcut printing function is disabled. Before starting to print the last print line, the carriage 70 is moved to the left end position, and printing is executed in the normal direction.

Accordingly, when all of the stored character data have been printed by the printer of the present invention, i.e. the movement of the carriage 70 is stopped at the position where the stop code or the pause code is found, the carriage 70 is always positioned where the last character was printed. It is, therefore, possible to continue printing the data input from the keyboard 120 in real time by manual typing, without wasteful movement of the carriage 70. As a result, responsiveness of the printing to manual typing is improved and the operator can continue to type in a natural way. Since all print lines except the last line are printed by the known bi-directional shortcut printing function, high-speed printing is assured.

Moreover, if there is any more data to be printed bi-directionally after manual typing operation, it is possible to restart the bi-directional printing by simply operating a start key.

Obviously, numerous modifications and variations of the present invention are possible in light of the above teachings. It is therefore to be understood that within the scope of the claims, the invention may be practiced otherwise than as specifically described herein.

What is claimed is:

1. A printer having a carriage comprising:

memory means for storing a text to be printed;

bi-directional printing means for printing the text on a line by line basis in a normal direction or in a reverse direction.

line identifying means for identifying a printing pause line of the text; and control means for disabling the bi-directional printing means and for printing the printing pause line in the normal direction when the line identifying means identifies the printing pause line of the text.

2. A printer according to claim 1 wherein the printer further comprises a print buffer for storing a line of the text to be printed next and the line identifying means identifies the printing pause line of the text when there is a stop or pause code data in the line stored in the print buffer.

3. A printer according to claim 2 wherein the printer further comprises keyboard and manual printing means responsive to an operation on the keyboard for printing a character, and the carriage stops at a position where a last character of the printing pause line was printed, whereby an operator of keyboard can next proceed manually to type a character which is printed at a position following the last character.

4. A printer according to claim 1, wherein said bi-directional printing means is operative to minimize a carriage travel between a print-ending position of a line and a print-starting position of the next line.

5. A printer having a carriage comprising:

memory means for storing a text to be printed;

bi-directional printing means for printing the text on a line by line basis in a normal direction or in a reverse direction;

line identifying means for identifying a last line of the text; and control means for disabling the bi-directional printing means and for printing the last line in the normal direction when the line identifying means identifies the last line of the text.

6. A printer according to claim 5 wherein the printer further comprises a print buffer for storing a line of the text to be printed next and the line identifying means identifies the last line of the text when there is a end-of-the-file code data in the line stored in the print buffer.

7. A printer according to claim 6 wherein the printer further comprises keyboard and manual printing means responsive to an operation on the keyboard for printing a character, and the carriage stops at a position where a last character of the last line was printed, whereby an operator of keyboard can next proceed manually to type a character which is printed at a position following the last character.

8. A printer according to claim 5, wherein said bi-directional printing means is operative to minimize a carriage travel between a print-ending position of a line and a print-starting position of the next line.

* * * * *

UNITED STATES PATENT AND TRADEMARK OFFICE
CERTIFICATE OF CORRECTION

PATENT NO. : 4,933,875

DATED : June 12, 1990

INVENTOR(S) : Yasumichi KOJIMA

It is certified that error appears in the above-identified patent and that said Letters Patent is hereby corrected as shown below:

On the title page,

Section [54] Title: After "EFFICIENT" insert --PRINTING--
and
Col. 1, line 2:

Signed and Sealed this

Eighth Day of October, 1991

Attest:

HARRY F. MANBECK, JR.

Attesting Officer

Commissioner of Patents and Trademarks